Jan. 9, 1951  B. G. BOWDEN  2,537,325
CYCLE FRAME
Filed Nov. 5, 1948  3 Sheets-Sheet 1
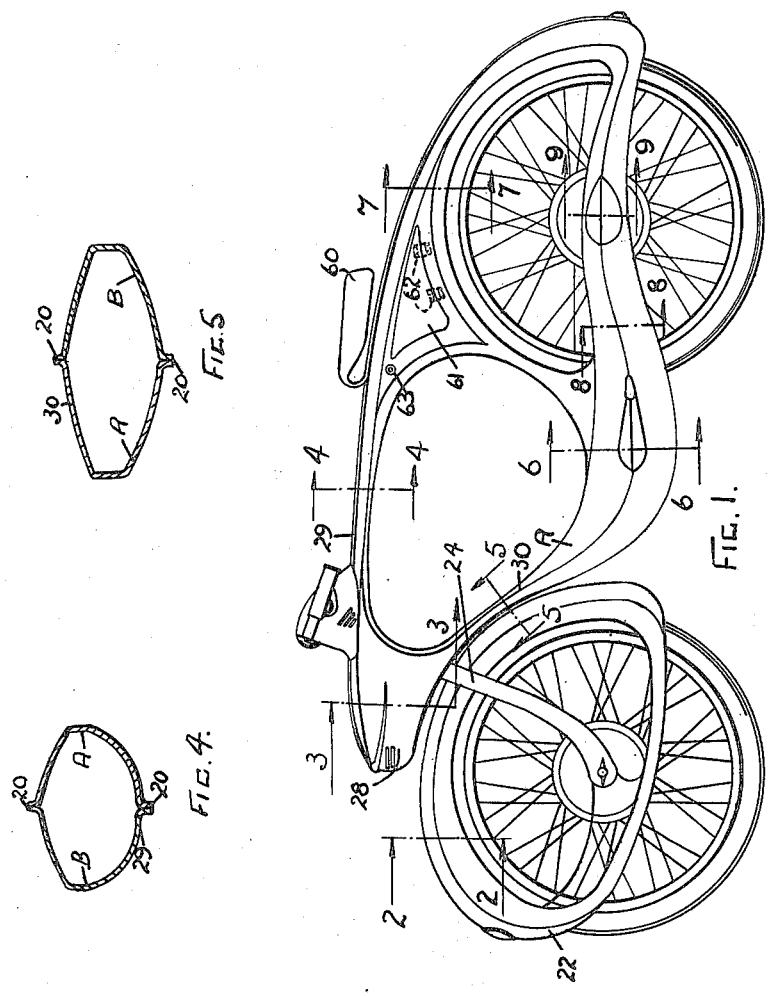
INVENTOR.
B. G. BOWDEN
BY
Mawhinney Mawhinney
Attys.

Jan. 9, 1951   B. G. BOWDEN   2,537,325
CYCLE FRAME
Filed Nov. 5, 1948   3 Sheets-Sheet 2
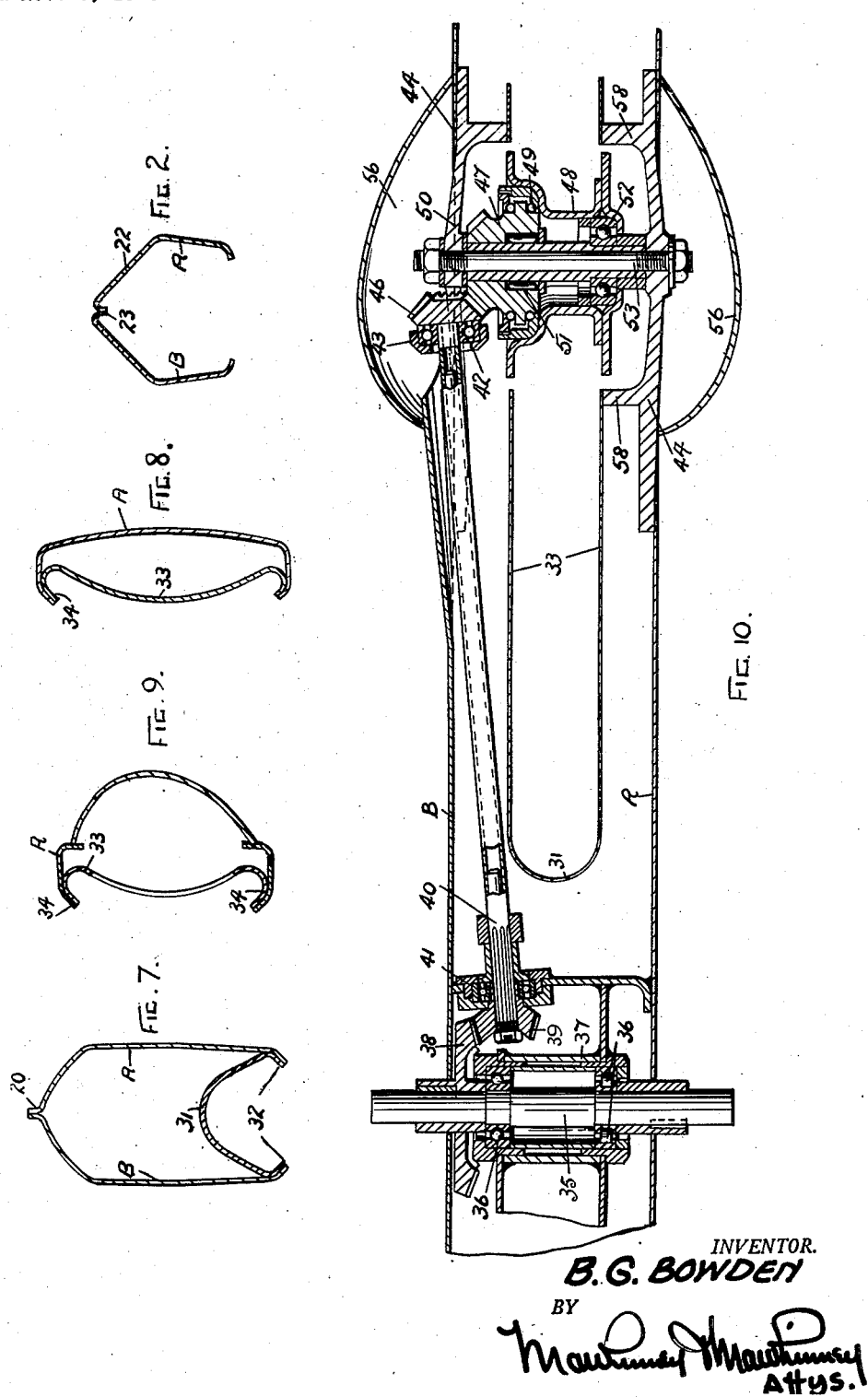
INVENTOR.
*B. G. BOWDEN*
BY
Attys.

Jan. 9, 1951　　　　　B. G. BOWDEN　　　　　2,537,325
　　　　　　　　　　　　CYCLE FRAME
Filed Nov. 5, 1948　　　　　　　　　　　　3 Sheets-Sheet 3
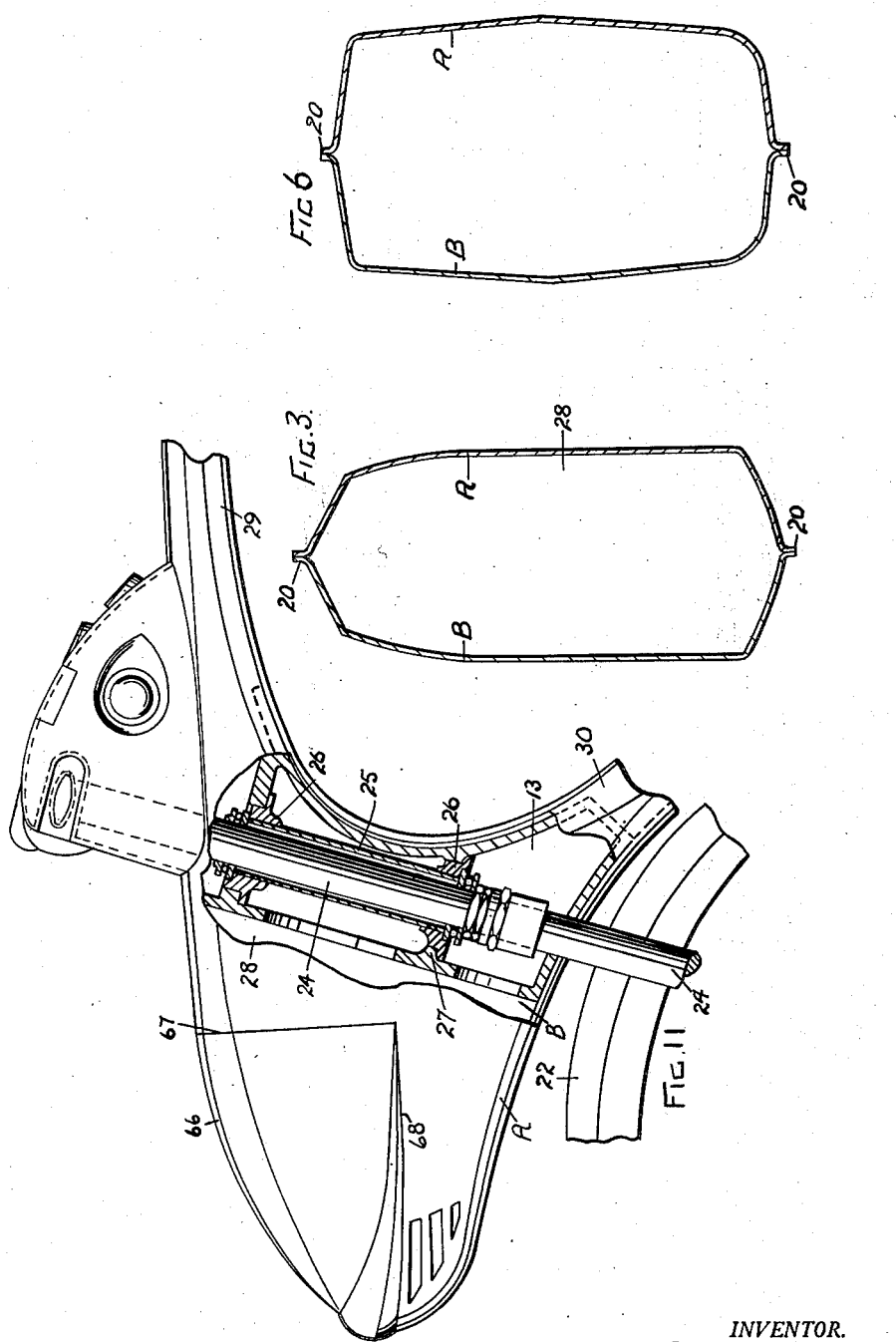
INVENTOR.
B. G. BOWDEN
BY
Mauhinney Mauhinney
Attys.

Patented Jan. 9, 1951

2,537,325

UNITED STATES PATENT OFFICE 2,537,325

CYCLE FRAME

Benjamin G. Bowden, Leamington Spa, England, assignor of one-half to Bowecrafts (Developments) Limited, Coventry, England Application November 5, 1948, Serial No. 58,471
In Great Britain September 18, 1946

5 Claims. (Cl. 280—281)

This invention relates to the frame of a cycle, particularly a pedal cycle.

The main object is to provide a light but strong frame which can be inexpensively manufactured and assembled and will be of very pleasing appearance.

According to the invention, the cycle frame is a hollow one built up mainly of complementary pressings (of light alloy or steel sheet) or mouldings (of a "plastic") secured to one another, along the central plane of the frame, and in side elevation it has an upper surface forming a smooth curve (rather like a quarter-ellipse) from the front, by the steering pillar, down to the far edge of the rear mudguard.

Preferably the cycle frame is arranged so as to provide an enclosure for the transmission between the crank spindle and the rear wheel. In addition the frame may provide, in the vicinity of where the saddle is to be supported, an interior locker (with a lid which can be opened) to serve for carrying a pump, tools or the like, and also an adjustment means for the saddle. Preferably the frame is built up of light alloy pressings which are resistance-welded together.

In the accompanying drawings:

Figure 1 shows in side elevation a cycle with one form of cycle frame according to the invention;

Figure 2 is a cross-section, to a larger scale, through the front mudguard, taken on the line 2—2 of Figure 1;

Figures 3 to 7 are cross-sections of the frame, substantially to the same larger scale, taken, respectively, on the lines 3—3 ... 7—7 of Figure 1;

Figures 8 and 9 are cross-sections, also to substantially the same larger scale, of portions of the frame taken on the lines, respectively, 8—8 and 9—9 of Figure 1;

Figure 10 is a sectional plan, substantially to the same larger scale, taken through the crank spindle and the rear wheel spindle; and Figure 11 is a part-sectional elevation, substantially to the same larger scale, mainly of the steering pillar.

Figures 3 to 9 show two main frame pressings, A and B, which may be taken as typical sections, but it will be obvious that there are many different ways in which the pressings can be shaped, different parts thereof being ribbed, indented or otherwise treated as desired to provide strength and ornamentation. The frame is mainly built up of these two complementary pressings (A and B) welded together along the central plane of the frame, and for this purpose the pressings are shown in Figures 3 to 7 as being formed with out-turned flanges 20. Obviously, however, the two main pressings may be welded to one another if desired, as by seam welding, without the provision of such flanges. Furthermore, they may be built up of individual parts welded together.

In the present instance the front mudguard 22 is also formed of two main pressings provided with inwardly-directed flanges 23 through which they may be welded together as shown by Figure 2, the mudguard being supported from the front steerable fork 24 in any convenient manner. The steering pillar, in which the front fork is journalled, comprises a tube 25 fast with rings 26, 26 which in turn are fast with a bracket 27 in the interior of the hollow bulbous portion 28, and welded to the adjacent portions of the main pressings A and B. Rearwardly of the steering pillar the upper frame member 29 has a section of which a cross-section is shown at Figure 4, and a down frame member 30 of which a cross-section is shown in Figure 5.

The rear mudguard 31 (see Figure 7) bridges the lower edges of the two main pressings, being welded thereto at 32, 32 as shown by Figure 7. At its rear edge it is integral with forwardly-extending portions 33 (Figure 8) on each side of the wheel which are integral also with its lower front edge (see Figure 10). Also, at the rear, the main pressings are divided from one another and extend forwardly on each side of the rear wheel (where their upper and lower flanges 34 are welded to those of the mudguard portions 33—see Figures 8 and 9), being reunited with one another, as shown in Figure 6, where the crank spindle 35 is journalled by means of bearings 36, 36 in a bracket 37 which is welded to the reunited main pressings.

The crank spindle carries a bevel gear 38 in mesh with a bevel pinion 39 splined upon the end of a drive shaft 40. The forward end of the drive shaft is journalled through a bearing 41 in another part of the bracket 37, and the rear end through a bearing 42 in a portion 43 of a bracket 44. The tail end of the shaft 40 carries a bevel pinion 46 in mesh with a bevel gear 47 by which the rear wheel hub 48 can be driven in a usual manner through a free wheel device 49, the bevel gear 47 being journalled on the stationary spindle sleeve 50 through needle rollers 51 and the hub 48 being journalled on the sleeve through the ball bearing 52. Release of the spindle bolt 53 enables the rear wheel hub to be removed completely from the frame. In the vicinity of the rear spindle cowlings 56 are detachably secured to the main pressings A and B, and the mudguard portions 33 have openings which are bridged by the aforesaid brackets 44. These are welded to the main pressings A and B, and they have flanges 58 extending towards and welded to the adjacent mudguard portions 33. Or the brackets may be bolted to the main pressings, the cowlings serving to screen the bolts.

The main pressings in the vicinity of the saddle 60 provide a locker closed by a cover 61 which is pivotally supported at 62, and biassed to the open position, being held closed by a press-release button 63. This locker provides accommodation for a pump (which can extend towards the steerable front fork) and for tools. In addition, an adjustable support (not shown) for the saddle is located in the interior of the locker, being available for adjustment purposes when the locker lid is open.

Furthermore, the compartment provided by the bulbous portion 28 may accommodate a battery, a bell, or even a small radio set; and to provide access the bulbous head may have a lid 66 hinged at 67, the lower edge of the lid lying along the line 68.

What I claim as my invention and desire to secure by Letters Patent of the United States is:

1. A pedal cycle having a steering pillar, a rear wheel, an approximately semi-circular guard for said wheel, a spindle for said wheel, a crank spindle, and a frame in which said pillar, spindles and guard are supported, said frame being built up mainly of two complementary, shaped sheet portions which are secured directly to one another in the central plane of the frame along their upper edges, and along the front part of their lower edges as far as and beyond said crank spindle, said portions providing an upper surface forming, in side elevation, a smooth curve from the front of the frame to the far edge of said guard, said portions having aligned pear-shaped openings between said steering pillar, crank spindle and the front edge of said guard, and having their edges around said openings directly secured together, said portions also having aligned approximately semi-circular openings to the curved upper edges of which said guard is secured, the parts of said sheet portions below said approximately semi-circular openings forming generally horizontal frame members extending, on opposite sides of the rear wheel, between the front and rear ends of said guard and supporting said rear wheel spindle.

2. A pedal cycle, according to claim 1, and having a transmission means between said spindles, characterised in that each of said generally horizontal frame members is boxed in by a member secured thereto, one of said boxed in members providing an enclosure for said transmission means.

3. A pedal cycle, according to claim 1, in which said complementary portions are light alloy pressings resistance-welded together.

4. A pedal cycle, according to claim 1, in which said complementary portions are sheet steel pressings provided with flanges welded together.

5. A pedal cycle, according to claim 1, in which said complementary portions form a hollow bulbous portion at the front of the frame, with said steering pillar extending through the rear of said bulbous portion.

BENJAMIN G. BOWDEN.

REFERENCES CITED

The following references are of record in the file of this patent:

UNITED STATES PATENTS

| Number | Name | Date |
| --- | --- | --- |
| 481,053 | Owen | Aug. 16, 1892 |
| 629,401 | Smyser | July 25, 1899 |
| 747,789 | Somerby | Dec. 22, 1903 |
| 2,089,889 | Giordani | Aug. 10, 1937 |
| 2,182,828 | Stutsman et al. | Dec. 12, 1939 |
| 2,199,536 | Booty | May 7, 1940 |